_(12)_ United States Patent
Robbin

(10) Patent No.: US 9,394,110 B2
(45) Date of Patent: Jul. 19, 2016

(54) APPARATUS FOR CONVEYING AND PLANT FOR SURFACE-TREATING ARTICLES

(75) Inventor: Joerg Robbin, Ammerbuch-Pfaeffingen (DE)

(73) Assignee: EISENMANN AG, Boeblingen (DE)

( * ) Notice: Subject to any disclaimer, the term of this patent is extended or adjusted under 35 U.S.C. 154(b) by 0 days.

(21) Appl. No.: 14/122,733

(22) PCT Filed: May 4, 2012

(86) PCT No.: PCT/EP2012/001907
§ 371 (c)(1),
(2), (4) Date: Nov. 27, 2013

(87) PCT Pub. No.: WO2012/163458
PCT Pub. Date: Dec. 6, 2012

(65) Prior Publication Data
US 2014/0083819 A1     Mar. 27, 2014

(30) Foreign Application Priority Data
May 31, 2011   (DE) .......................... 10 2011 103 729

(51) Int. Cl.
| B65G 15/14 | (2006.01) |
| B65G 47/00 | (2006.01) |
| B65G 37/00 | (2006.01) |
| B65B 35/24 | (2006.01) |

(Continued)

(52) U.S. Cl.
CPC ................ B65G 15/14 (2013.01); B62D 65/18 (2013.01); B65B 35/24 (2013.01); B65B 35/243 (2013.01); B65G 17/002 (2013.01); B65G 37/00 (2013.01); B65G 37/005 (2013.01); B65G 47/00 (2013.01)

(58) Field of Classification Search
CPC ........ B65G 15/14; B65G 47/00; B65G 37/00; B65G 37/005; B65B 35/24; B65B 35/243; B62D 65/18
USPC .............. 198/469.1, 474.1, 478.1, 339.1, 604
See application file for complete search history.

(56) References Cited

U.S. PATENT DOCUMENTS

| 5,577,593 A * | 11/1996 | Hooper ...................... 198/346.1 |
| 5,839,567 A | 11/1998 | Kyotani et al. |
| 6,390,279 B1 * | 5/2002 | Furukoshi .................. 198/465.1 |

(Continued)

FOREIGN PATENT DOCUMENTS

| DE | 196 41 048 A1 | 4/1998 |
| DE | 101 53 993 A1 | 5/2003 |

(Continued)

*Primary Examiner* — Leslie A Nicholson, III
(74) *Attorney, Agent, or Firm* — Factor Intellectual Property Law Group, Ltd.

(57) ABSTRACT

An apparatus for conveying articles, in which at least one endless drive train forms a load-bearing strand and a return strand and specifies a conveying direction. A guide device for the at least one endless drive train includes a first deflecting element and at least one second deflecting element, over which the at least one endless drive train circulates. The at least one endless drive train carries along a plurality of supporting members which are arranged and configured such that they interact with supporting structures to which at least one article can be fastened. Furthermore, the at least one endless drive train carries along a plurality of coupling members which are arranged and configured such that they interact with standardized holding components of vehicle bodies. Also, a surface treatment plant having such a conveying apparatus.

14 Claims, 9 Drawing Sheets

(51) Int. Cl.
  *B62D 65/18* (2006.01)
  *B65G 17/00* (2006.01)

(56) References Cited

U.S. PATENT DOCUMENTS

| | | | |
|---|---|---|---|
| 6,419,983 B1 | 7/2002 | Kreuzer | |
| 6,595,141 B2 * | 7/2003 | Ishikawa et al. | 104/163 |
| 7,201,105 B2 * | 4/2007 | Nishihara et al. | 104/172.3 |
| 8,336,701 B2 * | 12/2012 | Ruggaber et al. | 198/345.3 |
| 8,474,594 B2 * | 7/2013 | Robbin et al. | 198/345.3 |
| 2008/0251354 A1 | 10/2008 | Ruggaber et al. | |
| 2013/0313075 A1 | 11/2013 | Robbin et al. | |

FOREIGN PATENT DOCUMENTS

| | | |
|---|---|---|
| DE | 10 2009 004 433 A1 | 7/2010 |
| DE | 10 2010 045 013 A | 3/2012 |

\* cited by examiner

APPARATUS FOR CONVEYING AND PLANT FOR SURFACE-TREATING ARTICLES

RELATED APPLICATIONS

This application claims the filing benefit of International Patent Application No. PCT/EP2012/001907, filed on May 4, 2012, which claims the filing benefit of German Patent Application No. 10 2011 103 729.6, filed May 31, 2011, the contents of both of which are incorporated herein by reference.

FIELD OF THE INVENTION

The invention relates to a device for conveying objects having a) at least one continuous drive train, which forms a load-bearing strand and a return strand and specifies a conveying direction;

b) a guide device for the at least one continuous drive train, which comprises a first deflecting element and at least one second deflecting element over which the at least one continuous drive train revolves, wherein c) the at least one continuous drive train carries along a plurality of supporting members which are arranged and configured such that they can cooperate with supporting structures to which at least one object can be fastened.

Conveying devices of this type serve in the automotive industry for conveying vehicle bodes, as well as other objects such as vehicle body parts or the like, between, and particularly also in, individual processing or treatment stations.

Moreover, the invention relates to a plant for the surface treatment of objects having at least one treatment zone which comprises a conveying system by means of which an object can be conveyed through the at least one treatment zone.

BACKGROUND OF THE INVENTION

Vehicle bodies here are normally each fastened to a so-called skid, which generally comprises two bearing runners. Today's vehicle bodies are already manufactured with holding components which are standardised and matched to the skid technology. These holding components of the vehicle bodies are mostly holding plates on their floor. These holding plates cooperate with appropriately adapted bearing or locking elements on the skids, which are likewise known per se for example in the form of bearing pins and by way of which a vehicle body is fastened to a skid. For other objects, a skid carries along one or more workpiece carriers, for example, which receive the objects.

In order to drive the skid, in known conveyors of the type mentioned at the outset this lies for example with its bearing runners on the supporting members of the continuous drive train.

In the case of vehicle bodies, a skid of this type undergoes the same treatment in the individual treatment stations as the vehicle body fastened to it. If a vehicle body on a skid is guided for example through a drier, the associated skid is also heated each time to then be cooled again with the vehicle body. As a result, in each drying procedure, a considerable amount of energy is used for heating and cooling the respective skid.

In treatment zones in which the skid does not undergo any direct treatment, it still has to be carried along with the vehicle body. The overall mass of the vehicle body and skid to be conveyed is therefore considerably greater than the mass of a vehicle body alone. For example, a vehicle body with a weight of approximately 400 kg is conveyed on a skid which weighs approximately 150 kg. Since relatively large masses have to be moved, the amount of energy used for transporting the vehicle body and skid is greater than for a vehicle body alone.

All in all, in the case of commercially known conveying devices of the type mentioned at the outset which cooperate with skids, the total energy balance in terms of the vehicle bodies to be treated is adversely affected and the total operating costs of the plant are therefore increased.

It is therefore an object of the invention to provide a device of the type mentioned at the outset which takes these considerations into account. With this, it should however always be possible to convey objects other than vehicle bodies.

SUMMARY OF THE INVENTION

This object may be achieved in a device of the type mentioned at the outset in that d) the at least one continuous drive train moreover carries along a plurality of coupling members which are arranged and configured in such a way that they can cooperate with standardised holding components of vehicle bodies.

Therefore, according to the invention, the continuous drive train can optionally convey supporting structures, for example skids, which are laden with objects other than vehicle bodies, or it can convey vehicle bodies without skids. Moreover, vehicle bodies can also be conveyed on skids should this be required.

It is particularly desirable if the overall height of the conveyor device is as low as possible. It is therefore preferable if a) the coupling members are connected to the continuous drive train such that they can pivot about a pivot axis;

b) the coupling members can be carried along by the load-bearing strand in an operating position and by the return strand in a return position which is pivoted with respect to the operating position;

c) an inward-pivot device, by means of which coupling members can be transferred from the return position into the operating position, are present at a first end of the continuous drive train;

d) an outward-pivot device, by means of which coupling members can be transferred from the operating position into the return position, is present at a second end of the continuous drive train.

If the coupling members are constructed as elements, for example as bearing pins, which project upwards in the case of the load-bearing strand, these can be pivoted at the deflecting ends of the continuous drive train and carried along by the return strand in a return position which requires a lower overall height. This is particularly desirable if the load-bearing strand and the return strand of the continuous drive train extend above one another.

It is particularly favourable here if the pivot axis extends parallel to the conveying direction. In this case, the coupling members can be pivoted to the side out of the region in which the continuous drive train runs.

Each coupling member is advantageously supported by a pivot element which is connected to the continuous drive train at one end by way of a pivot joint.

If the pivot axis is arranged in a region near to the continuous drive train, the coupling members can be brought completely laterally adjacent to the continuous drive train.

In order to leave the region above the continuous drive train in the load-bearing strand free for supporting structures to be conveyed, such as skids, it can be favourable if coupling members can be carried along by the load-bearing strand in an idle position which is pivoted with respect to the operating position.

If it is required that not all the coupling members always assume their operating position, the inward-pivot device is preferably configured in such a way that coupling members can be optionally moved, or not moved, out of their return position into the operating position.

It is favourable if the outward-pivot device comprises guide elements which force the coupling members to carry out the pivotal movement. It is thus possible for the coupling members to change position without requiring additional control members for this, which would in turn require a separate drive.

In the case of the inward-pivot device, the optional pivotal movement of certain coupling members can be achieved by a pressure element by means of which a pivotal movement of the coupling members can be triggered.

The flexibility in terms of conveyable vehicle bodies is increased if the at least one continuous drive train carries along at least coupling members of a first type and coupling members of a second type, which can each cooperate with different standardised holding components of vehicle bodies.

It has proven effective in practice if the coupling members are constructed as bearing pins, as already mentioned at the outset.

It is moreover advantageous if the supporting members are constructed as a bearing profile for bearing runners of a conveying skid.

It is ensured in particular that vehicle bodies and also skids with vehicle bodies or other objects are both conveyed reliably if at least two guide devices, each with a continuous drive train, are present whereof the load-bearing strands extend parallel to one another.

With respect to the plant of the type mentioned at the outset, the above-mentioned object may be achieved in that the conveying system comprises a conveying device having several or all of the features described above.

The advantages correspond to the advantages mentioned above in connection with the conveying device.

It is moreover particularly advantageous here if a) the treatment zone is a first treatment zone with a first conveying system and at least one further treatment zone is present which comprises a second conveying system which is different from the first conveying system and by means of which the vehicle body can be conveyed through the second treatment zone;

b) a transfer device, by means of which the vehicle body can be transferred from the first conveying system to the second conveying system or from the second conveying system to the first conveying system, is arranged in a transfer region between the first treatment zone and the second treatment zone.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

An exemplary embodiment of the invention is explained in more detail below with reference to the drawings, which show.

DETAILED DESCRIPTION OF THE PRESENT INVENTION

Figure 1:
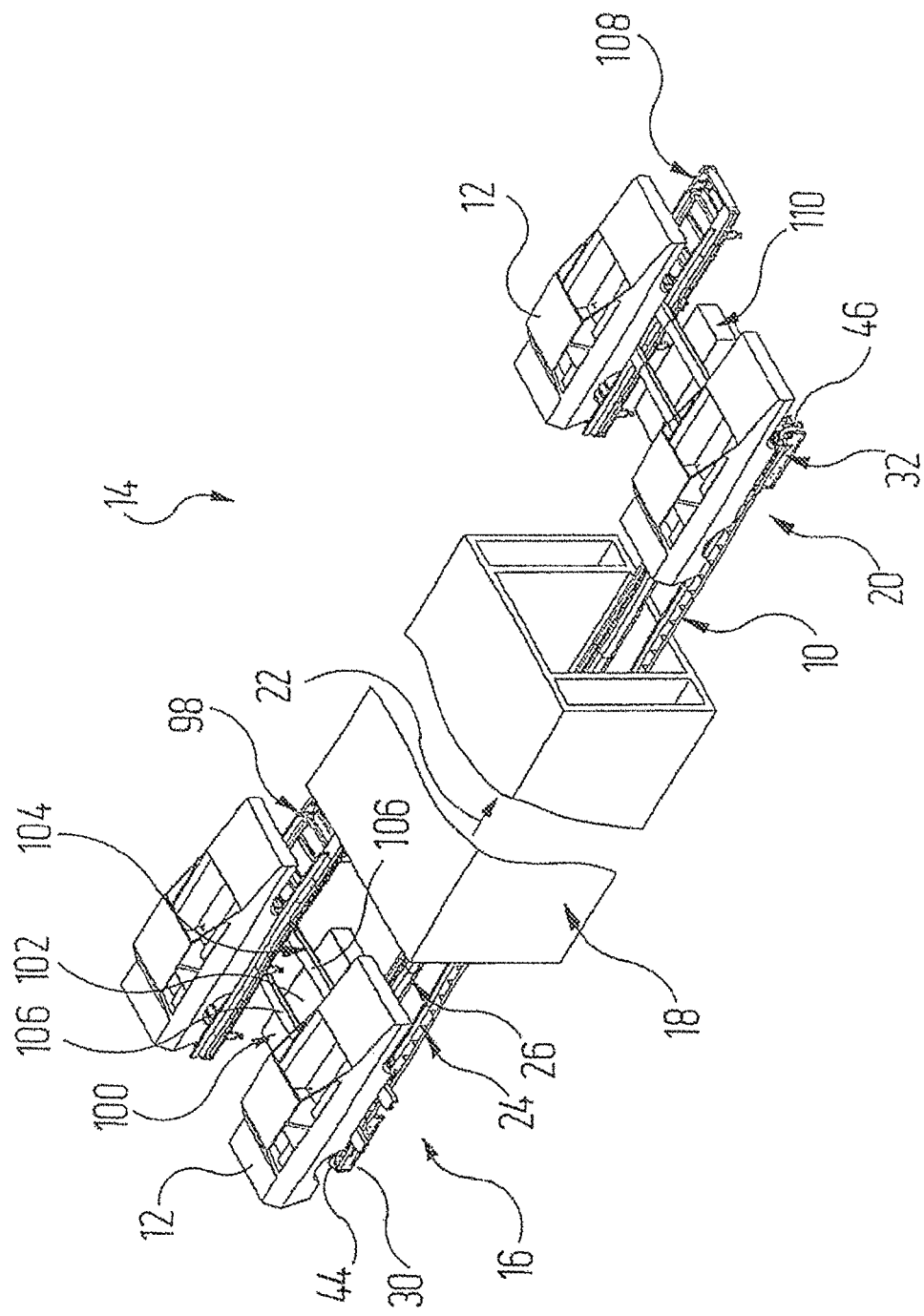
FIG. 1 a perspective view of a drying zone, in which a supporting chain conveyor with bearing profiles for skids and pivotable supporting pins for vehicle bodies is arranged, by means of which vehicle bodies or objects are conveyed between an entry region and an exit region through a drying tunnel.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

In the Figures, 10 denotes a supporting chain conveyor with the aid of which objects, which are indicated by way of example as vehicle bodies 12, are to be conveyed for example through a plant for surface treatment or through individual treatment zones of such a plant. By way of example, a drying zone 14 is shown, in which the vehicle bodies 12 or other objects (not shown here specifically) are conveyed from an entry region 16 through a drying tunnel 18 to an exit region 20. The vehicle bodies 12 are conveyed on the supporting chain conveyor 10 in the direction of the arrow 22, which is only shown in FIGS. 1, 2, 6 and 9.

The supporting chain conveyor 10 comprises two mutually parallel extending drive units 24 and 26 for transporting the vehicle bodies 12. The drive units 24, 26 are of a mirror-inverted construction with reference to a vertical plane extending parallel to them, but are otherwise identical and, for the sake of simplicity, are therefore described below predominantly using the drive unit 26 by way of example, which is arranged on the left in the conveying direction 22, and particularly with reference to FIGS. 5, 6 and 8. The above also applies accordingly for the drive unit 24.

The drive unit 26 guides a continuous drive train in the form of a continuous conveying chain 28 which revolves between a bearing end 30 and a drive end 32 of the drive unit 26. To this end, the drive unit 26 comprises a guide profile 34 for the conveying chain 28, which is anchored by way of a plurality of support structures (not provided specifically with a reference numeral).

The conveying chain 28 provides a load-bearing strand 36 and a return strand 38, wherein the load-bearing strand 36 lies on an upper intermediate floor 40 of the guide profile 34 and the return strand 38 lies on a lower intermediate floor 42 of the guide profile 34.

The load-bearing strand 36 and the return strand 38 of the conveying chain 28 extend between a deflecting pinion 44 at the bearing end 30 and a deflecting pinion 46 at the drive end 32 of the drive unit 26. The deflecting pinions 44 and 46 are therefore each deflecting elements and are mounted here such that they can rotate about a horizontal axis of rotation so that the conveying chain 28 revolves in a vertical plane. The deflecting pinion 46 at the drive end 32 can be driven in a manner known per se and is coupled to the corresponding deflecting pinion of the drive unit 24 so that the conveying chain 28 of the drive unit 26 and the conveying chain of the drive unit 24 revolve in synchronised manner.

Figure 6:
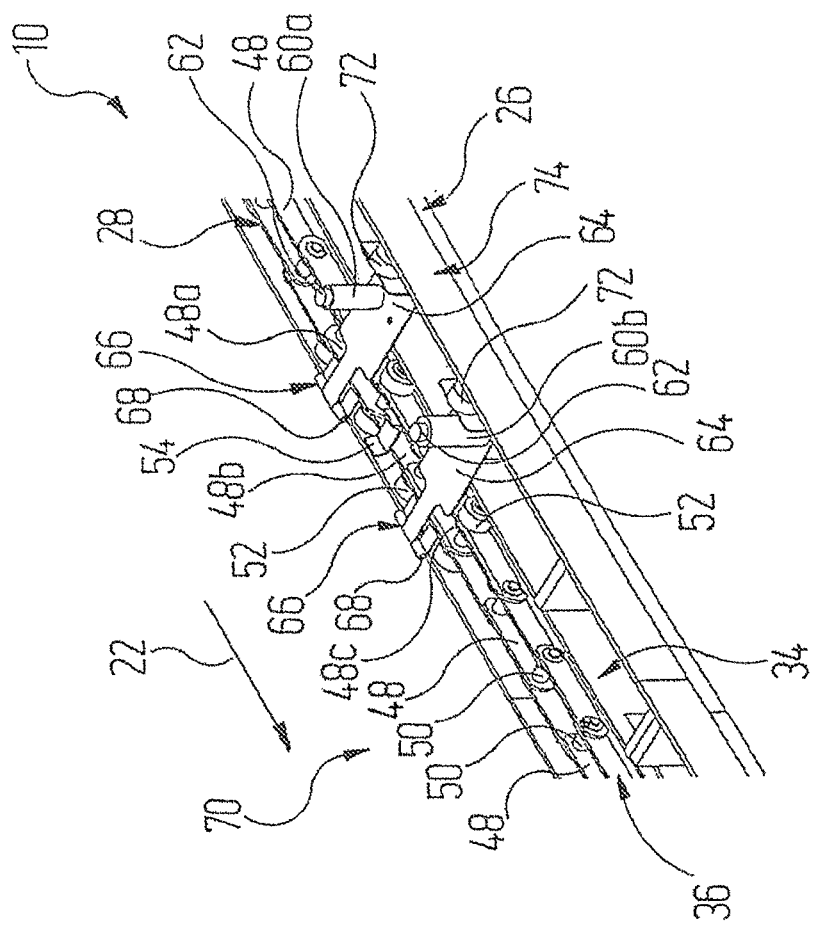
FIG. 6 a perspective view of an enlarged detail of a conveying chain of the supporting chain conveyor from another viewing direction.

As shown particularly clearly in FIG. 6, the conveying chain 28 comprises a plurality of chain members 48, which are connected to one another in articulated manner as known per se by means of freely rotatable axle pins 50. In the Figures, not all the chain members 48 or axle pins 50 are provided with a reference numeral.

Between certain load-bearing supporting chain members 48a, 48b, 48c which follow one another in the conveying direction, the associated axle pins 50 project laterally over the chain members 48 and each support a roller 52 there, by means of which these supporting chain members 48a, 48b, 48b and therefore the conveying chain 28 can roll along the upper intermediate floor 40 or the lower intermediate floor 42 of the guide profile 34 of the drive unit 26.

The central supporting chain member 48b comprises, as a supporting member, a bearing profile 54 with a U-shaped cross-section which is carried along by the conveying chain 28 such that it is open to the top in the load-bearing strand 36, as well as in and against the conveying direction 22. The bearing profile 54 cooperates with one of two bearing runners 56 of a supporting structure in the form of a skid 58, which is known per se, on which a vehicle body 12 or other objects, possibly in connection with one or more workpiece carriers, can be fastened in a manner which is likewise known per se.

To this end, the bearing profile 54 is of a complementary construction to the bearing runner 56 of the skid 58 so that this bearing runner can be placed on the bearing profile 54 and the skid is secured against moving to the side by the upwardly projecting U-limbs of the bearing profile 54.

The supporting chain member 48a upstream of the supporting chain member 48b with the bearing profile 54 carries along a bearing pin 60a as a coupling member for a vehicle body 12, which comprises a bearing cone 62 at its free end. In terms of its dimensions and position relative to the conveying chain 28, the bearing pin 60a is adapted so that it can cooperate with one of the standardised holding components of the vehicle bodies 12 and, in particular, engage with the bearing cone 62 in certain areas in a through opening provided for this purpose.

The bearing pin 60a is supported by a pivot element in the form of a pivot plate 64 which is connected at one end to the supporting chain member 48a by way of a joint 66 such that it can pivot or tip about a pivot axis 68, with the term pivot being used for consistency below. The pivot axis 68 here is arranged on the inside, which faces towards the opposite drive unit 24, adjacent to the conveying chain 28, i.e. adjacent to the supporting chain member 48a here, and extends parallel to the conveying direction 22 when the corresponding supporting chain member 48a is located in the load-bearing strand 36 or in the return strand 38 of the supporting chain 28.

The bearing pin 60a or the associated pivot plate 64 can thus be pivoted in the load-bearing strand 36 of the conveying chain 28 between an operating position, in which a vehicle body 12 can be received, and an idle position. If the bearing pin 60a and the pivot plate 64 assume the operating position, the pivot plate 64, starting from the joint 66, extends transversely over the supporting chain member 48a and beyond this, with the bearing pin 60a projecting upwards from the pivot plate 64. In the idle position of the bearing pin 60a in the region of the load-bearing strand 36 of the conveying chain 28, the pivot plate 64 is pivoted into the region of the supporting chain conveyor 10 between the drive units 24, 26, with the bearing pin 60a projecting downwards; this region between the drive units 24, 26 forms a guide region 70.

At its end which is remote from the joint 66, the pivot plate 64 supports a supporting roller 72 which is mounted such that it can rotate about an axis which extends perpendicularly to the joint axis 68. The guide profile 34 of the drive unit 26 comprises a first running rail 74 with a horizontal running surface which extends parallel on the outside, adjacent to the conveying chain 28. This running rail 74 is arranged and dimensioned in such a way that the supporting roller 72 rests on the horizontal running surface of the running rail 74 when the bearing pin 60a or the associated pivot plate 64 assumes the operating position.

In the guide region 70, a second running rail 76 extends parallel to the conveying chain 28, which likewise comprises a horizontal running surface and is shown in FIGS. 4, 5, 7 and 8. The running rail 76 is arranged and dimensioned in such a way that the supporting roller 72 lies on the horizontal running surface of the running rail 76 when the bearing pin 60a or the associated pivot plate 64 assumes the idle position.

The supporting chain member 48c, which is arranged downstream of the supporting chain member 48b with the bearing profile 54 as seen in the conveying direction, carries along a bearing pin 60b as a coupling member for a vehicle body 12. Like the bearing pin 60a, this bearing pin 60b supports a bearing cone 62 at its free end and is connected accordingly to the supporting chain member 48c such that it can pivot about a pivot axis 68 by way of a pivot plate 64 and a joint 66.

The bearing pin 60b is arranged on the pivot plate 64 associated therewith and dimensioned in such a way that it can cooperate with standardised holding components on vehicle bodies 12 which are different to those for the bearing pin 60a. Otherwise, the statements above relating to the bearing pin 60a also apply analogously to the bearing pin 60b.

Therefore, the bearing pins 60a cooperate for example with standardised holding components in the front region of a particular vehicle body 12, whilst the bearing pins 60b match standardised holding components in the rear region of this vehicle body 12. For other vehicle bodies 12, the bearing pins 60b can be required for example at the front and the bearing pins 60a at the rear, or a vehicle body 12 cooperates with only four bearing pins 60a or with only four bearing pins 60b.

Depending on the type of vehicle body 12 to be conveyed, the bearing pin 60a or 60b mounted near to the corresponding group of supporting chain members 48a, 48b, 48c is optionally located in its operating position in the load-bearing strand 36 of the conveying chain 28, whilst the bearing pin 60a, 60b which is not required in each case assumes its idle position.

The number of chain members 48 between two adjacent supporting chain members 48a and 48c associated with a particular vehicle body 12 and two adjacent and related bearing pins 60a and 60b is always selected so that two adjacent and related bearing pins 60a, 60b match two corresponding holding components of the vehicle body 12. The spacing between two such pairs of bearing pins 60a, 60b on a conveying chain 28 can be optionally altered over the course of the service life of the conveying chain 28 by removing chain members 48 to account for changes in the length of the conveying chain 28 which occur during operation.

Essentially, one bearing pin 60a or 60b of each conveying chain 28 should engage in each case in one holding component of the vehicle body 12. Each second bearing pin 60a or 60b of each conveying chain 10 can support a bearing plate instead of the bearing cone 62, on which the vehicle body 4 can lie for example with its respective door sill. It is thus possible to compensate manufacturing tolerances of the vehicle body 12 or the above-mentioned changes in length of the conveying chains 28.

Figure 4:
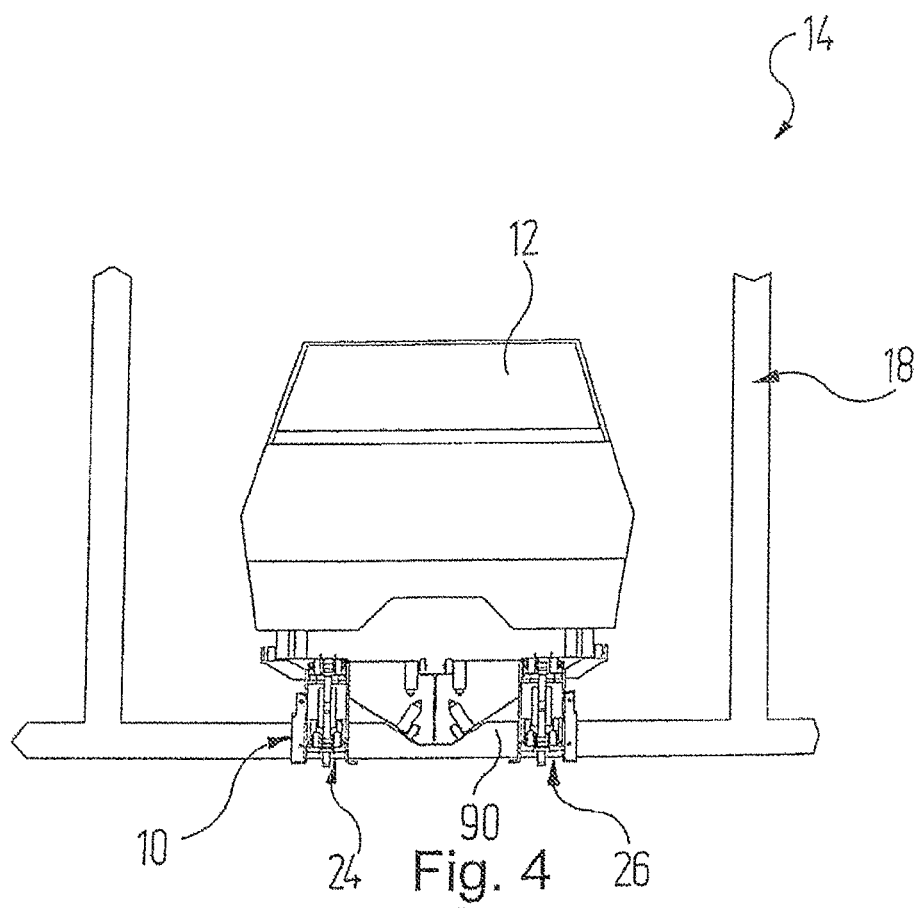
FIG. 4 a front view of the drying tunnel, wherein a vehicle body is placed on supporting pins of the supporting chain conveyor.
Figure 5:
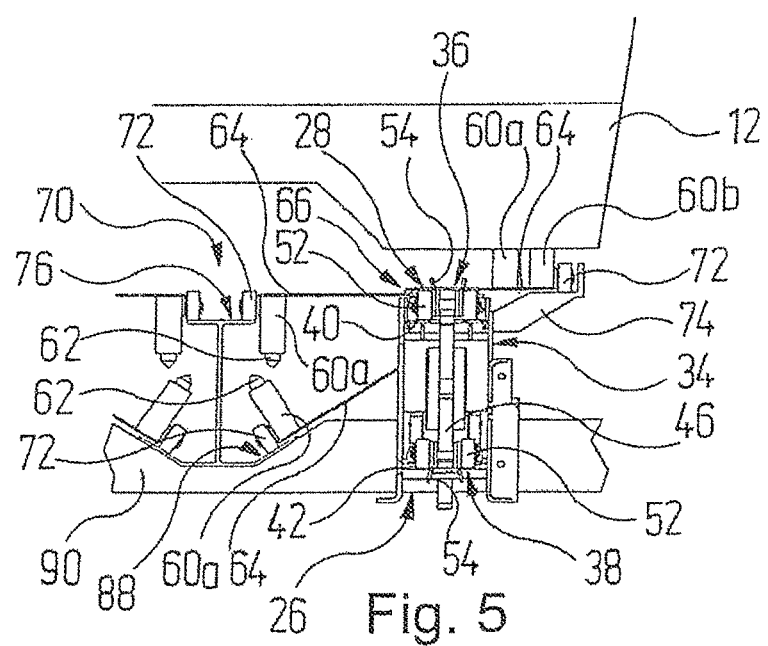
FIG. 5 an enlarged detail of a conveying train of the supporting chain conveyor shown in FIG. 4.

In FIGS. 4 and 5, a vehicle body 12 is shown which lies directly on the bearing pins 60a, 60b, wherein bearing pins 60a which are not required are carried along by the conveying chain 28 in their idle position, as are the unrequired bearing pins 60b, which are not shown, however, for the sake of clarity.

Figure 7:
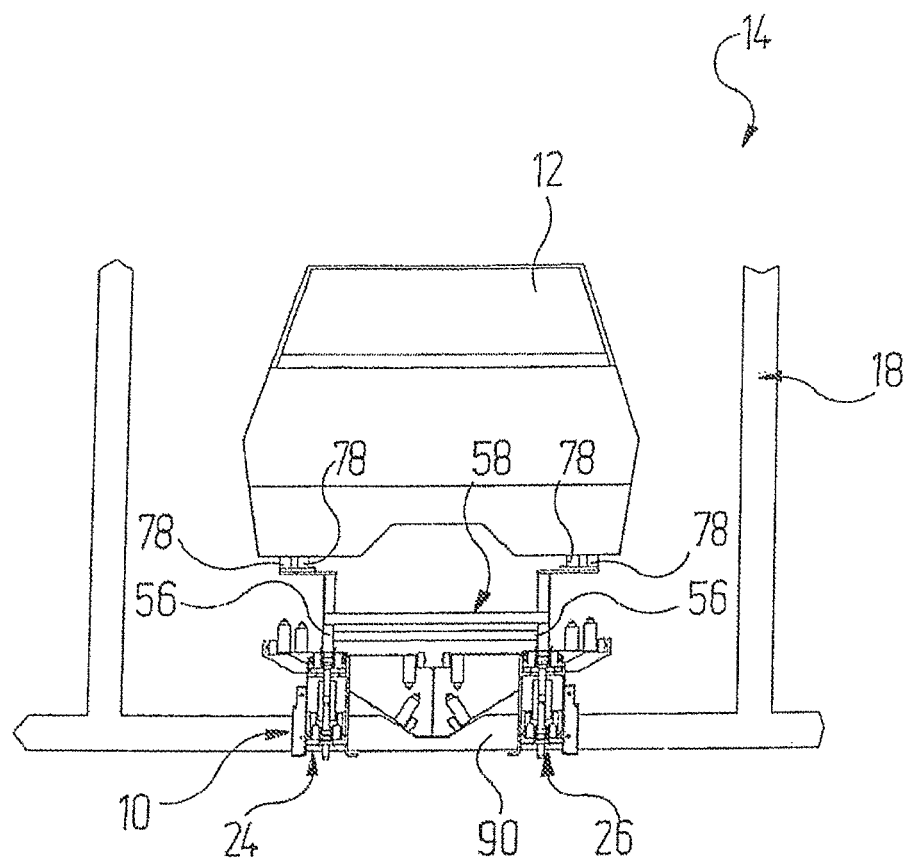
FIG. 7 a front view, corresponding to FIG. 4, of the drying tunnel, wherein a vehicle body is fastened to a skid which is placed on bearing profiles of the supporting chain conveyor.
Figure 8:
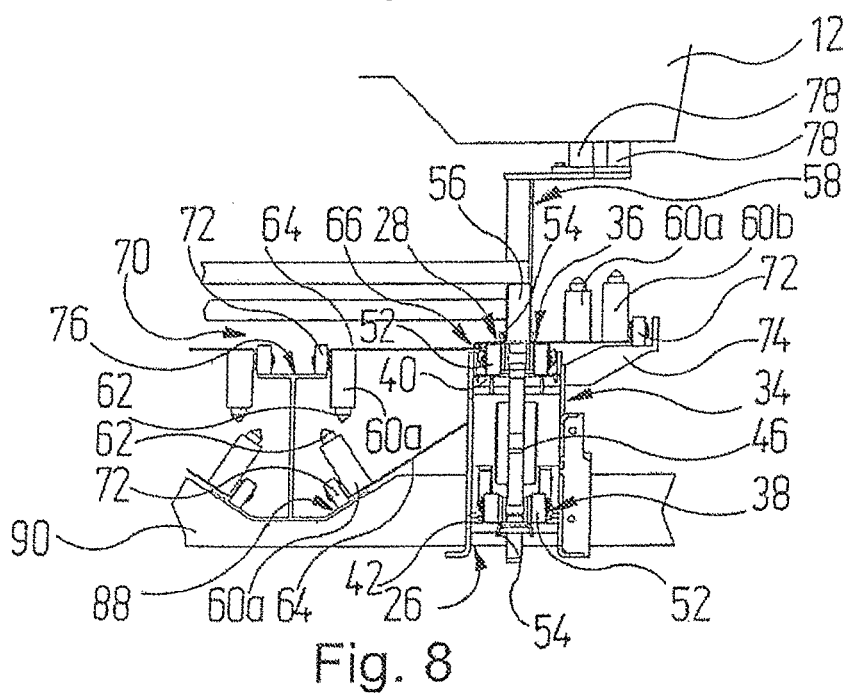
FIG. 8 an enlarged detail of a conveying train of the supporting chain conveyor shown in FIG. 7.

As explained above, the supporting chain conveyor 10 can convey vehicle bodies 12 or other objects on a skid 58 in that this is placed on the bearing profile 54. This is shown in FIGS. 7 and 8. To this end, the skid 58 comprises bearing pins 78 which correspond in terms of their arrangement and dimensions to the bearing pins 60a, 60b. As can be seen in FIGS. 7 and 8, as a skid is conveyed, the bearing pins 60a, 60b are either carried along by the load-bearing strand 36 of the conveying chain 28 in their operating position or in their idle position.

The drive units 24 and 26 are constructed to be as low as possible, with the minimum overall height being specified by the deflecting pinions 44 and 46 at the bearing end 30 and at the drive end 32. As can be seen in particular in FIG. 9, the spacing between the deflecting pinion 46 at the drive end 32 and the floor denoted by 80 is so small that the bearing pins 60a, 60b would come into contact with the floor 80 if they were to maintain their operating position as they revolve around the deflecting pinion 46 and ultimately project downwards in the return strand 36.

An outward-pivot device 82 is therefore present at the drive end 32 of the drive unit 26, by means of which bearing pins 60a, 60b, which arrive at the deflecting pinion 46 in their operating position, are transferred to a return position.

In this return position, the pivot plates 64 are pivoted into the guide region 70 between the drive units 24 and 26 so that the bearing pins 60a, 60b in the return strand 38 point upwards in the direction away from the floor 80.

Figure 9:
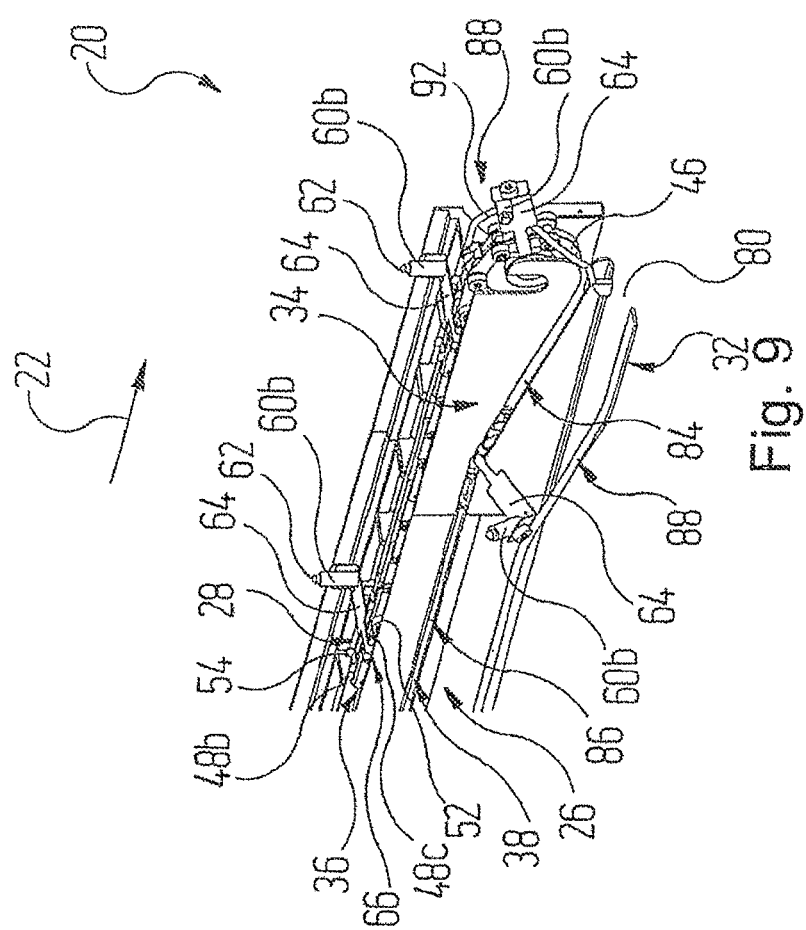
FIG. 9 a perspective view of a first revolving end of the conveying train according to FIG. 5 or 8, wherein an outward-pivot device for pivoting the supporting pins can be seen.
Figure 10A:
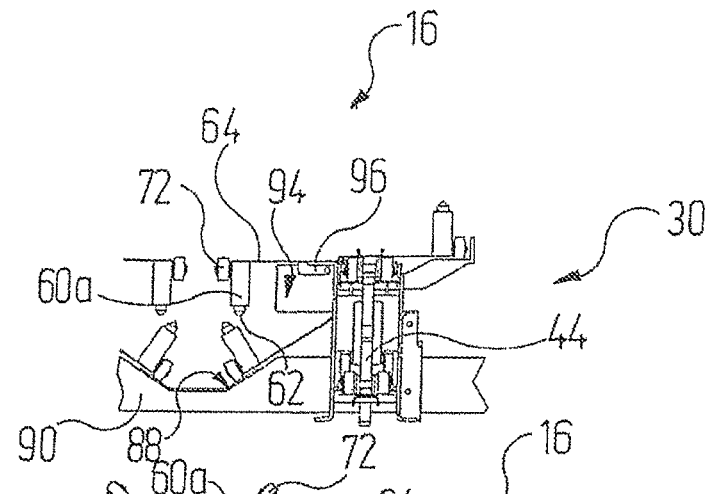
FIGS. 10A to 10D a front view of a second revolving end of the conveying train according to FIG. 9, wherein an inward-pivot device for a pivotal movement of the supporting pins can be seen and four phases of a pivoting procedure of bearing pins are shown.
Figure 10B:
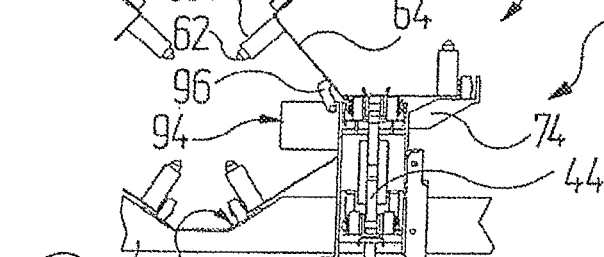
Figure 10C:
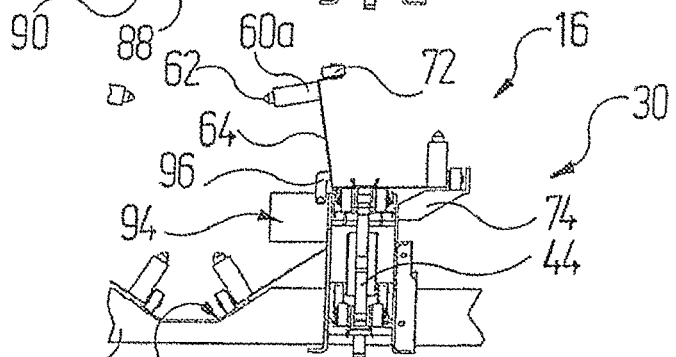
Figure 10D:
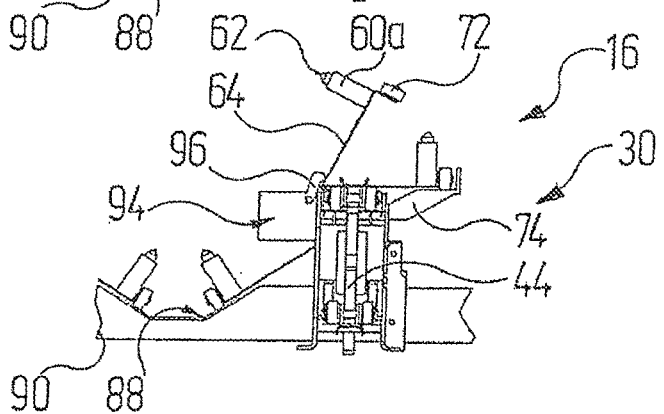

As can be seen in FIG. 9, the return strand 38 of the conveying chain 28 is directed in a manner known per se by way of a guide portion 84, which slopes upwards in the running direction, into a so-called neck 86 in which the spacing between the floor 80 and the conveying chain 28 is greater than between the floor 80 and the deflecting pinions 46, 48. If the pivot plates 64 were to extend horizontally there and the bearing pins 60a, 60b were to project vertically upwards, there would be a collision between the bearing pins 60a, 60b in the return strand and the bearing pins 60a, 60b which assume their idle position in the load-bearing strand and project vertically downwards.

In order to prevent this, a third running rail 88, which is integrated in a floor insulation 90 of the drying tunnel 18, is associated with each drive unit 24, 26 in the guide region 70. This third running rail 88 provides a running surface for the rollers 72 on the pivot plate 64, which slopes with respect to the horizontal at least in the neck 86. The third running rail 88 or the running surface thereof is arranged and dimensioned in such a way that the pivot plates 64 slope downwards from the associated joint 66 and project into the guide region 70 so that the bearing pins 60a, 60b in the return strand 38 remain out of the collision region with the bearing pins 60a, 60b in the idle position in the return strand 36.

The outward-pivot device 82 in the present exemplary embodiment is now constructed as a type of sliding block guide and to this end comprises a curved guide strut 92 which are arranged on the revolving side of the deflecting pinion 46. The guide strut 92 extends in such a way that pivot plates 64 are forced to pivot out of the operating position and into the return position in the guide region 70 between the drive units 24, 26. The guide strut 92 here is constructed in such a way that pivot plates 64 which assume the idle position in the load-bearing strand 36 of the conveying chain 28 revolve around the deflecting pinion 46 without pivoting about the pivot axis 68 and thus, from the idle position, arrive in the return position around the return strand 38 without further influence.

At the opposite bearing end 30 of the drive unit 26, those bearing pins 60a, 60b which are needed in their operating position for transporting a particular vehicle body 12 in the load-bearing strand 38 of the conveying chain 28 must now be pivoted back out of their return position into the operating position.

To this end, an inward-pivot device 94, which is shown in FIGS. 10A to 10D and by means of which selected pivot plates 64 can optionally be transferred from the return position into the operating position, is present at the bearing end 30.

For this purpose, the inward-pivot device 94 comprises, as a pressure element, a pivot ram 96 which can be driven by motor, hydraulically or pneumatically and can press against the pivot plates 64 from below and pivot these upwards when the pivot plates 64 are again located in the load-bearing strand 36 after the conveying chain 28 has revolved around the deflecting pinion 44 at the bearing end 30 of the drive unit 26. As a result, a respective pivot plate 64 is pivoted out of its return position into its operating position. FIGS. 10A to 10D show four phases of such an inward-pivot procedure in a front view. In the position shown in FIG. 10D, the pivot plate 64 has exceeded a tipping point upon which gravity causes it to fall down. At this point, a damper can be integrated in the first running rail 74 to buffer the impact of the roller 72 on the corresponding pivot plate 64 against the running rail 74.

If the pivot ram 96 is not activated, a pivot plate 64 is guided away without moving over the pivot ram 96 and is carried along in its idle position by the load-bearing strand 36 of the conveying chain 28.

Figure 2:
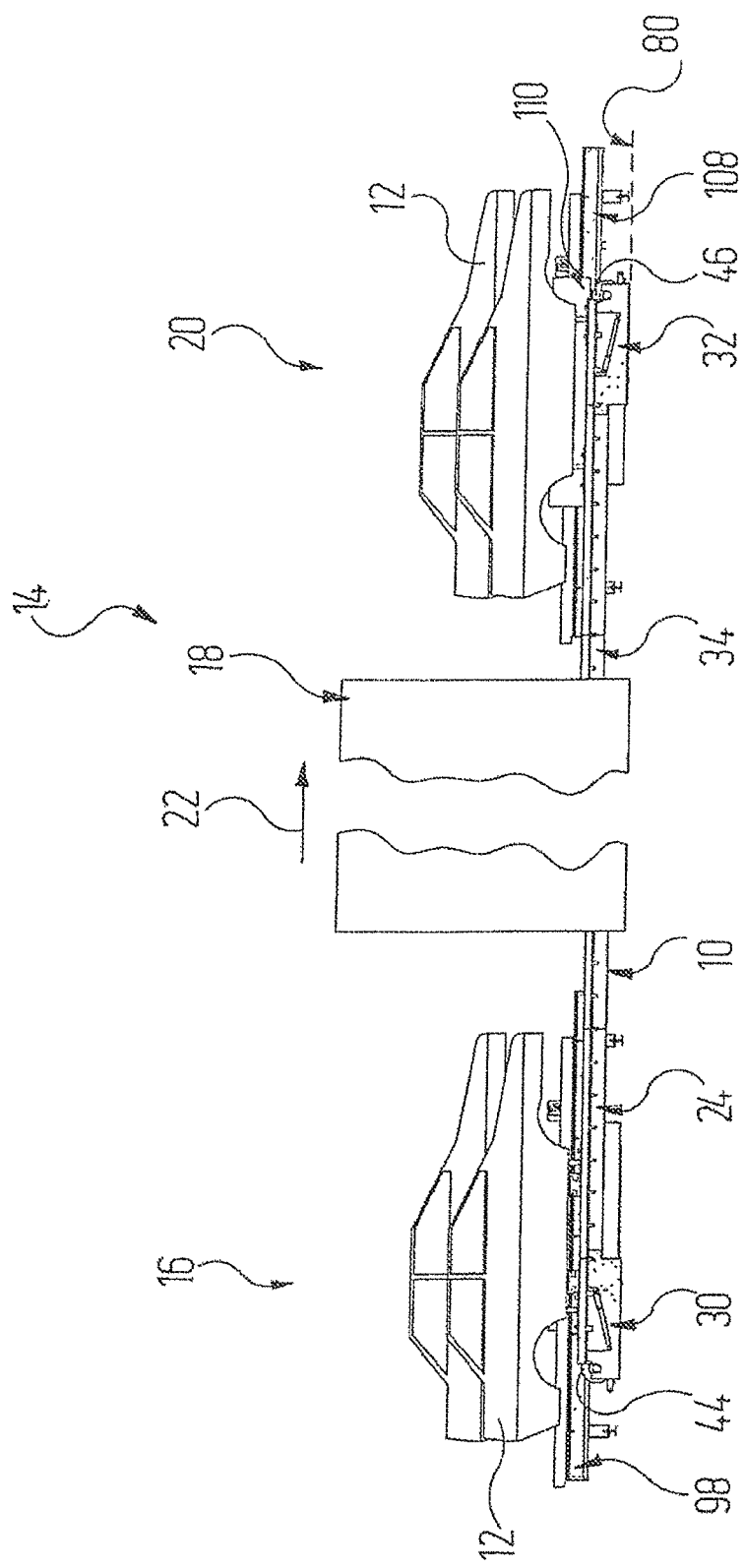
FIG. 2 a side view of the drying zone of FIG. 1.
Figure 3:
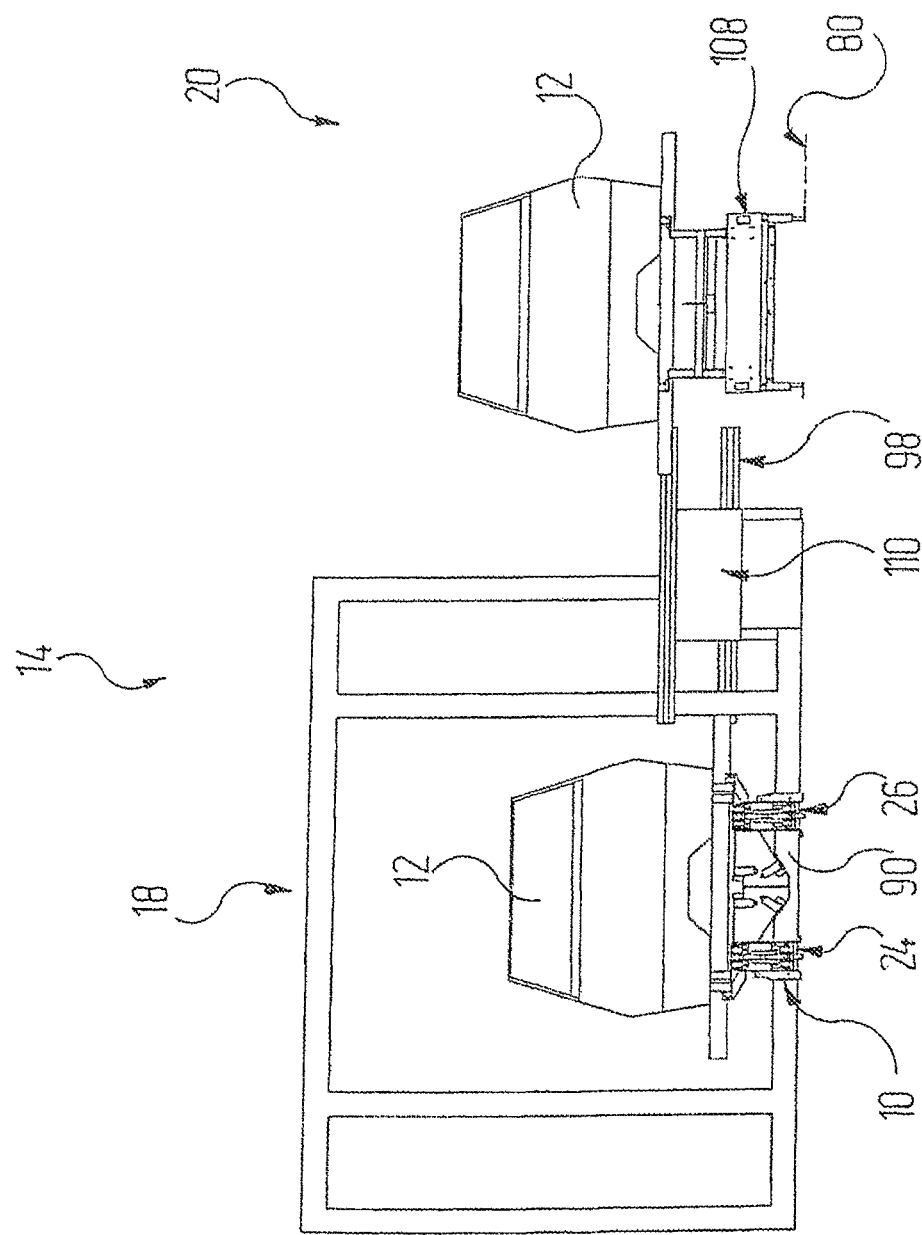
FIG. 3 a front view of the exit region of the drying zone.

As can be seen in FIGS. 1 to 3, arranged in the entry region 16 of the drying zone 14 is a supply conveyor 98 in the form of a roller conveyor which extends parallel to the supporting chain conveyor 10 and conveys vehicle bodies 12 on skids 58 to the drying zone 14, which come from previous operation stations.

In order to transfer a vehicle body 12 from the supply conveyor 98 to the supporting chain conveyor 10, a transfer device 100 is arranged between these, which comprises a conveying table 102 which can be lifted and lowered and on the upper side of which a fork carriage 104 with two carrying forks 106 can moreover be moved perpendicularly to the conveying direction 22.

The fork carriage 104 can receive both a vehicle body 12 without a skid 58, as well as a skid 58 to which a vehicle body 12 or other objects are fastened, from the supply conveyor 98 and transfer it to the supporting chain conveyor 10.

In the first case, the fork carriage 104 moves into the clearance between the skid 58 and the vehicle body 12 and lifts this off the skid 58. If a skid 58 with a vehicle body 12 or other objects is to be transferred, the fork carriage 104 moves accordingly into the clearance between the roller conveyor 98 and the skid 58, which is then lifted off the roller conveyor 98 as a whole.

The fork carriage 104 then moves the vehicle body 12 or the skid 58 over the supporting chain conveyor 10 and deposits the vehicle body 12 or the skid 58 thereon. This depositing procedure can take place on the one hand when the conveying chain 28 is stationary. If the conveying table 102 is constructed so that it can be moved in and against the conveying direction 22, it can move with the conveying chains 28 and deposit the vehicle body 12 or the skid 58 on the supporting chain conveyor 10 without the drive of the conveyor chains 28 having to be interrupted. Therefore, continuous operation is possible in this case.

A delivery conveyor 108 in the form of a further roller conveyor is present in corresponding manner in the exit region 20 of the drying zone 14, it being possible to transfer vehicle bodies 12 or skids 58 with vehicle bodies 12 from the supporting chain conveyor 10 to said delivery conveyor with the aid of a second transfer device 110. The transfer device 110 is identical to the transfer device 100.

A vehicle body 12 or a skid 58 with a vehicle body 12 can also be removed here when the conveying chain 28 is stationary or when it is revolving if the transfer device 110 is configured accordingly for a movement in and against the conveying direction 22.

In a modification which is not shown specifically, the forks 106 of the transfer device 110 can be used in the exit region 20 of the drying zone 14 here to transfer the associated bearing pins 58 into their idle position whilst the bearing pins 58 are still located in the load-bearing strand 36 of the conveyor chains 28. These then run in this position around the deflecting pinion 46 at the drive end 32 of the drive units 24, 26 and thus arrive automatically at the respective return strand 38 in the return position.

Figure 11:
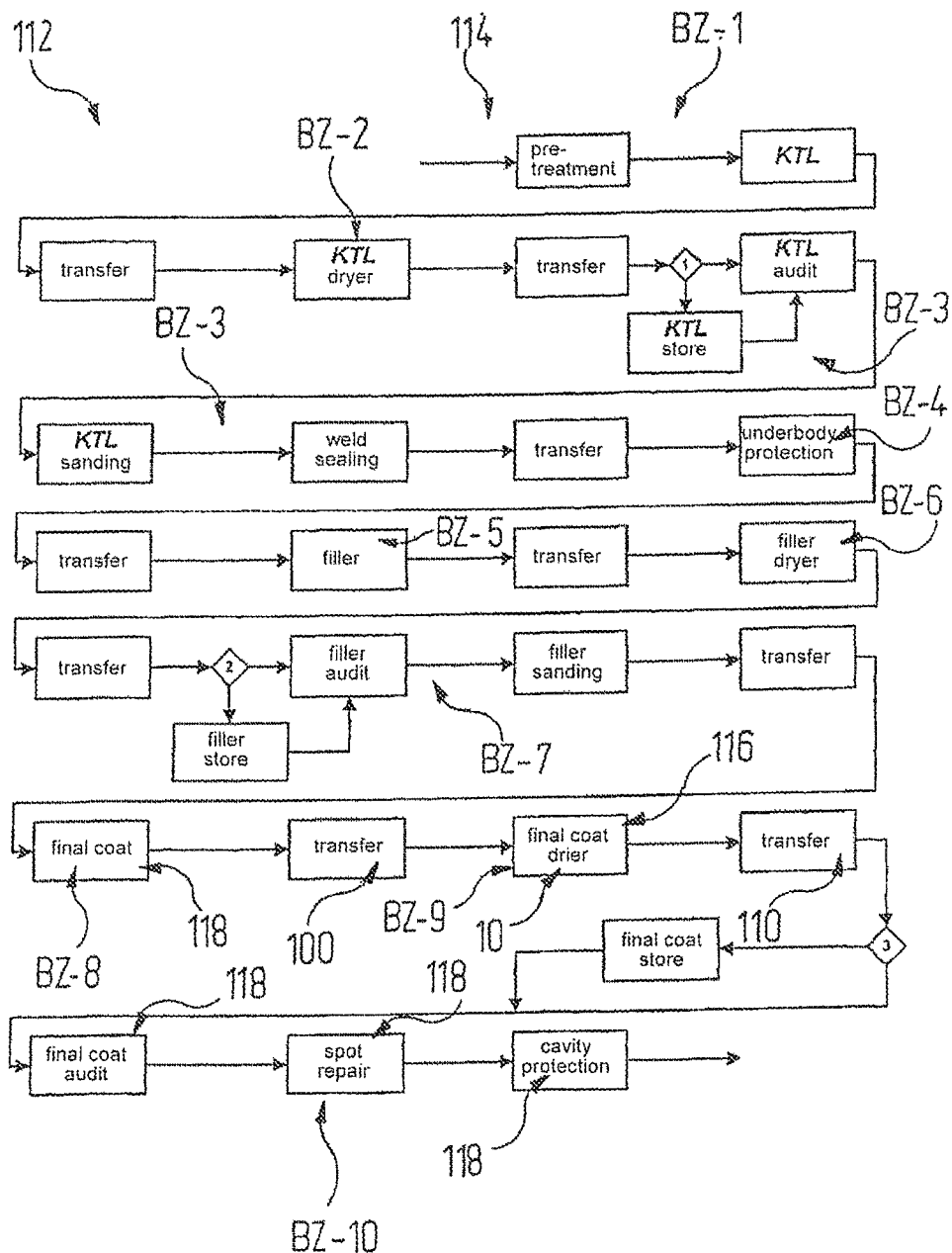
FIG. 11 a schematic view of a treatment line of a surface treatment plant for vehicle bodies having different treatment zones, of which several have a supporting chain conveyor, and transfer regions in which vehicle bodies are transferred to a respective supporting chain conveyor or removed from such.

FIG. 11 shows, by way of example, a treatment line 112 in the form of a plant diagram for a surface treatment plant for vehicle bodies 12, which is denoted as a whole by 114 and to which the vehicle bodies 114 are supplied from bodyshell work. The surface treatment plant 114 comprises different treatment zones BZ which are optionally divided into treatment regions BB and between which a transfer region is arranged in each case. In detail, these are the following treatment zones BZ and treatment regions BB, with only the treatment zones BZ being denoted as such in FIG. 11 for the sake of clarity.

| BZ-1 | BB-1 | Pre-treatment (VBH, e.g. one or more dip tanks) |
| | BB-2 | Cataphoretic dip coating (KTL) |
| | | Transfer region (Transfer) |
| BZ-2 | | KTL dryer |
| | | Transfer region |
| BZ-3 | BB-1 | KTL-audit |
| | BB-2 | KTL-sanding |
| | BB-3 | Weld sealing (NAD) |
| | | Transfer region |
| BZ-4 | | Underbody protection (UBS) |

-continued

| | | Transfer region |
|---|---|---|
| BZ-5 | | Filler |
| | | Transfer region |
| BZ-6 | | Filler-drier |
| | | Transfer region |
| BZ-7 | BB-1 | Filler-audit |
| | BB-2 | Filler-sanding |
| | | Transfer region |
| BZ-8 | | Final coat |
| | | Transfer region |
| BZ-9 | | Final coat-drier |
| | | Transfer region |
| BZ-10 | BB-1 | Final coat-audit |
| | BB-2 | Spot repair |
| | BB-3 | Cavity protection (HRK) |

After the cavity protection, the vehicle bodies 12 are conveyed to final assembly. The surface treatment plant 114 can also differ from the plant diagram shown in FIG. 11 and comprise both further, as well as fewer and/or other, treatment zones BZ and treatment regions BB.

At branch points denoted by 1, 2 and 3, vehicle bodies 12 can be removed from the treatment line 112 and temporarily stored in the regions KTL-store, filler-store and final coat-store as production buffers.

In two of the treatment zones BZ which follow one another in the treatment line 112, it is now possible for mutually different conveyor systems to be present, with the aid of which the vehicle bodies 12 are conveyed through the respective treatment zones BZ.

Therefore, for example, a supporting chain conveyor 10 as conveyor system 116 can be provided in the treatment zone BZ-9 in which the final coat is dried in order to move the vehicle bodies 12 without a skid 58 through the treatment zone BZ-9.

On the other hand, in the treatment zone BZ-8 in which the final coat is applied before the drying procedure, or in the treatment zone BZ-10, in which the final coat is checked after drying and cavity protection is carried out, a conveyor system 118 in the form of a roller conveyor can be provided, which corresponds to the supply conveyor 98 or the delivery conveyor 108 and on which the vehicle bodies 12 are conveyed on a skid 58.

In the transfer region between the treatment zones BZ-8 and BZ-9, there is then a transfer device 100 for lifting the vehicle bodies 12 off the skid 58 and transferring them to the supporting chain conveyor 10. In the transfer region between the treatment zones BZ-9 and BZ-10, a transfer device 110 is arranged accordingly, by means of which the vehicle bodies 12 can be transferred from the supporting chain conveyor 10 back to a skid 58 on the roller conveyor 118.

In general, where it is unfavourable for the skid 58 to undergo the same treatment as the vehicle body 12, it is always possible to provide a supporting chain conveyor 10 in a treatment zone BZ. Where it is necessary to alternate between two conveyor systems, a transfer device 100 and 110 is then provided accordingly.

In the treatment line 112 shown in FIG. 11, it is for example also possible to have supporting chain conveyors 10 as a conveyor system in the treatment zones BZ-2, BZ-4 and BZ-6, which supporting chain conveyors cooperate with transfer devices 100 and 110 upstream and downstream of the respective treatment zone as seen in the conveying direction.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A device for conveying objects, the device comprising:
 a) at least one continuous drive train which forms a load-bearing strand and a return strand and specifies a conveying direction;
 b) a guide device for the at least one continuous drive train, which comprises a first deflecting element and at least one second deflecting element over which the at least one continuous drive train revolves, wherein
 c) the at least one continuous drive train carries along a plurality of supporting members which are arranged and configured to cooperate with supporting structures to which at least one object can be fastened, and wherein,
 d) the at least one continuous drive train carries along a plurality of coupling members to cooperate with standardised holding components of-vehicle bodies, wherein
 e) the coupling members are connected to the continuous drive train such that the coupling members pivot about a pivot axis;
 f) the coupling members can be carried along by the load-bearing strand in an operating position and by the return strand in a return position which is pivoted with respect to the operating position;
 g) an inward-pivot device which transfers coupling members from the return position into the operating position is present at a first end of the continuous drive train; and,
 h) an outward-pivot device which transfers coupling members from the operating position into the return position is present at a second end of the continuous drive train.

2. The device according to Claim 1, wherein the pivot axis extends parallel to the conveying direction.

3. The device according to Claim 1, wherein each coupling member is supported by a pivot element which is connected to the continuous drive train at one end by way of a pivot joint.

4. The device according to Claim 1, wherein the pivot axis is arranged in a region near to the continuous drive train.

5. The device according to Claim 1, wherein the outward-pivot device and the inward-pivot device are configured in such a way that the coupling members can be carried along by the load-bearing strand in an idle position which is pivoted with respect to the operating position.

6. The device according to claim 5, wherein the inward-pivot device is configured in such a way that coupling members can be moved, or not moved, out of their return position into the operating position.

7. The device according to Claim 1, wherein the outward-pivot device comprises guide elements which force the coupling members to carry out the pivotal movement.

8. The device according to Claim 1, wherein the inward-pivot device comprises a pressure element which triggers a pivotal movement of the coupling members.

9. The device according to claim 1, wherein the at least one continuous drive train carries along at least coupling members of a first type and coupling members of a second type which can each cooperate with different standardised holding components of vehicle bodies.

10. The device according to claim 1, wherein the coupling members are bearing pins.

11. The device according to claim 1, wherein the supporting members are bearing profiles for bearing runners of a conveying skid.

12. The device according to claim 1, wherein there are at least two guide devices having at least one respective continuous drive train whereof the load-bearing strands extend parallel to one another.

13. A plant for the surface treatment of objects comprising:
 at least one treatment zone;
 a conveying system which conveys an object through the at least one treatment zone, wherein
 the conveying system comprises the device according to claim 1.

14. The plant according to claim 13, wherein
 a) the treatment zone is a first treatment zone with a first conveying system and at least one further treatment zone with a second conveying system which is different from the first conveying system and which conveys the vehicle body through the second treatment zone; and further comprising:
 b) a transfer device which transfers the vehicle body from the first conveying system to the second conveying system or from the second conveying system to the first conveying system, and wherein the transfer device is arranged in a transfer region between the first treatment zone and the second treatment zone.

\* \* \* \* \*